US010803565B2

(12) United States Patent
Chen et al.

(10) Patent No.: US 10,803,565 B2
(45) Date of Patent: Oct. 13, 2020

(54) LOW-LIGHT IMAGING USING TRAINED CONVOLUTIONAL NEURAL NETWORKS

(71) Applicant: INTEL CORPORATION, Santa Clara, CA (US)

(72) Inventors: Chen Chen, Mountain View (CA); Qifeng Chen, Santa Clara, CA (US); Vladlen Koltun, Santa Clara, CA (US)

(73) Assignee: Intel Corporation, Snata Clara, CA (US)

( * ) Notice: Subject to any disclaimer, the term of this patent is extended or adjusted under 35 U.S.C. 154(b) by 67 days.

(21) Appl. No.: 16/031,152

(22) Filed: Jul. 10, 2018

(65) Prior Publication Data

US 2019/0043178 A1  Feb. 7, 2019

(51) Int. Cl.
| G06T 5/00 | (2006.01) |
| G06T 5/40 | (2006.01) |
| G06T 1/20 | (2006.01) |
| G06N 20/00 | (2019.01) |
| G06N 3/02 | (2006.01) |
| G06T 9/00 | (2006.01) |

(52) U.S. Cl.
CPC .............. *G06T 5/009* (2013.01); *G06T 1/20* (2013.01); *G06T 5/40* (2013.01); *G06N 3/02* (2013.01); *G06N 20/00* (2019.01); *G06T 9/002* (2013.01); *G06T 2207/10024* (2013.01); *G06T 2207/20081* (2013.01); *G06T 2207/20084* (2013.01)

(58) Field of Classification Search
CPC ............. G06T 1/20; G06T 2207/10024; G06T 2207/20081; G06T 2207/20084; G06T 5/009; G06T 5/40; G06T 9/002; G06N 20/00; G06N 3/02
See application file for complete search history.

(56) References Cited

U.S. PATENT DOCUMENTS

| 2010/0183217 A1* | 7/2010 | Seung ................... G06K 9/342 |
| | | 382/156 |
| 2015/0109525 A1* | 4/2015 | Kimura .................... G06T 5/40 |
| | | 348/370 |
| 2017/0237961 A1* | 8/2017 | Barron ................. H04N 1/6086 |
| | | 348/223.1 |
| 2018/0220061 A1* | 8/2018 | Wang .................. G06K 9/00664 |
| 2018/0359416 A1* | 12/2018 | Hold-Geoffroy ........................... |
| | | G06K 9/00664 |
| 2019/0075301 A1* | 3/2019 | Chou .................... H04N 19/159 |
| 2019/0108618 A1* | 4/2019 | Hwang ................ G06N 3/0454 |
| 2019/0147355 A1* | 5/2019 | Rennie ................... G06N 5/046 |
| | | 706/47 |
| 2019/0333198 A1* | 10/2019 | Wang ...................... G06T 5/002 |

OTHER PUBLICATIONS

Chen et al., "Learning to See in the Dark" (Year: 2017).*

(Continued)

*Primary Examiner* — Kenny A Cese
(74) *Attorney, Agent, or Firm* — Hanley, Flight & Zimmerman, LLC (57) ABSTRACT

An example apparatus for imaging in low-light environments includes a raw sensor data receiver to receive raw sensor data from an imaging sensor. The apparatus also includes a convolutional neural network trained to generate an illuminated image based on the received raw sensor data. The convolutional neural network is trained based on images captured by a sensor similar to the imaging sensor.

21 Claims, 6 Drawing Sheets

(56) References Cited

OTHER PUBLICATIONS

Chen, Qifeng et al. "Learning to See in the Dark"; IEEE Conference on Computer Vision and Pattern Recognition, Submitted May 2018, also submitted to conference Nov. 2017, but not accepted,10 pages.

Chen, Qifeng et al. "Fast Image Fully-Convolutional Networks;" 2017 IEEE International Conference on Computer Vision (ICCV) date of conference Dec. 2017, 16 pages.

Kingma, Diederik et al. "A Method for Stochastic Optimization"; Published as a conference paper at the 3rd International Conference for Learning Representations, San Diego, 2015, 15 pages.

Long,Jonathan,et al. "Fully Convolutional Networks for Semantic Segmentation"; Computer Vision and Pattern Recognition (cs.CV) to appear in PAMI (accepted May 2016); journal edition 10 pages.

Ronneberger, Olaf et al. "U-Net Convolutional Networks for Biomedical Image Segmentation"; Computer Science Department and BIOSS Centre for Biological Signalling Studies, University of Freiburg, Germany May 2015 8 pages.

Lecun,Y et al. "Backpropagation Applied Ot Handwritten Zip Code"; Published in: Neural Computation (vol. 1 , Issue: 4 , Dec. 1989) 11 pages.

S, Wenzhe, et al. "Realtime Single Image and Video Super Resolution Using an Efficient Sub-Pixel Convolutional Neural Network"; Computer Science > Computer Vision and Pattern Recognition (Submitted on Sep. 16, 2016 (v1), last revised Sep. 23, 2016 this version, v2. 10 pages.

Xu Li et al."Deep Edge-Aware Filters"; Proceedings of the 32nd International Conference on Machine Learning, Lille, France, 2015. JMLR: W&CP vol. 37. Copyright 2015 by the author(s) 10 Pages.

\* cited by examiner

LOW-LIGHT IMAGING USING TRAINED CONVOLUTIONAL NEURAL NETWORKS

BACKGROUND

Cameras may include multiple settings that can be adjusted to control exposure in captured images. In some examples, the settings include shutter speed or aperture, which can be decreased or increased, respectively, to capture more photons of light. Another setting that can be adjusted is the sensitivity setting (ISO) ISO of a camera image sensor. The determination of ISO with digital still-cameras is described in ISO 12232:2006 (first published in August 1998, revised in April 2006, and corrected in October 2006). The ISO value of a camera controls the exposure by using software in the camera to make it extra sensitive to light.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

As discussed above, shutter speed and aperture can be adjusted to increase the amount of light captured by a sensor. For example, reducing shutter speed increases the amount of time that light photons are collected and thus the total number of photons collected by sensors. However, decreasing shutter speed may introduce motion blur associated with movement of one or more objects or the imaging device. Aperture can be increased to allow more photons of light to be focused onto an image sensor via a lens. However, increasing aperture may have a sometimes unwanted effect of reducing depth of field and generating another type of blur in regions outside the depth of field. Moreover, aperture is limited by the size of the lens, which can be both expensive and unwieldy. In addition, a higher ISO setting can be used to increase brightness of images. For example, some digital cameras may be adjusted to ISO settings of 4,000,000 and above. However, increasing brightness via the ISO may also amplify noise in the resulting image. Moreover, low-light environments may provide one lux or less light at a camera lens. Low-light environments may not provide enough light to produce a bright image without substantial noise.

The present disclosure relates generally to techniques for low-light imaging. Specifically, the techniques described herein include an apparatus, method and system for low-light imaging using trained convolutional neural networks. An example apparatus includes a raw sensor data receiver to receive raw sensor data. For example, the apparatus may be a pipelined processor. The apparatus includes a convolutional neural network trained to generate an illuminated image based on the received raw sensor data. As used herein, an illuminated image refers to an image with an enhanced brightness that exceeds the original brightness of a captured image. For example, an illuminated image may be an image captured using a particular shutter speed, but displaying an equivalent brightness level of an image captured with a higher illuminance, measured in lux, at the sensor. In some examples, the apparatus further includes a data packer to pack the raw sensor data into four channels including a reduced spatial resolution by a factor of two in each of a vertical and horizontal direction to generate packed data if the raw sensor data is a Bayer array. For example, the packed data may include four channels. Each of the channels may include the pixels corresponding to one of the four pixels in the 2×2 pattern of the Bayer array, which includes one blue, one red, and two green pixels. In some examples, the data packer can arrange the raw sensor data into 6×6 blocks and pack the raw sensor data into nine channels by exchanging adjacent elements of the blocks to generate packed data if the raw sensor data is an X-Trans array. The X-Trans array is a 6×6 pattern color filter array used to reduce the Moiré effect in captured images containing patterns that overlap with other color filter array patterns. The X-Trans array is used in the sensor models X-Trans, X-Trans II, and X-Trans III by Fujifilm. In some examples, the apparatus also includes a black level subtractor to remove a predetermined black level bias from the packed data. The apparatus further includes an amplifier to amplify the packed data prior to processing the packed data at the trained CNN. The trained CNN may generate an illuminated image based on the amplified data.

The techniques described herein thus enable brighter images to be generated from raw sensor data without increasing ISO or aperture, or reducing shutter speed. For example, the techniques may enable devices with poor low-light imaging capabilities to generate bright images from raw sensor data of image captures using fast shutter speeds. In particular, the images may appear comparable to the brightness of an image captured with many more stops of light, but without the accompanying motion blur that may result from using longer shutter speeds, the noise from using a higher ISO, or the blur associated with increased aperture. As used herein, a stop refers to a brightness factor of 2×. Moreover, the resulting images may have good contrast, low noise, and well-adjusted color. In addition, the techniques may be used to enhance brightness in both still photos as well as video. For example, video frames may be processed using the techniques described herein individually in real time. Although described with respect to the Bayer filter and X-Trans filter, the techniques described herein may be used with any of a variety of color filter arrays used in various imaging sensors, including the RGBE filter, the CYYM filter, the CYGM filter, the RGBW Bayer filter, the RGBW #1, the RGBW #2 filter, the RGBW #3 filter, among other possible color array filters.

Figure 1:
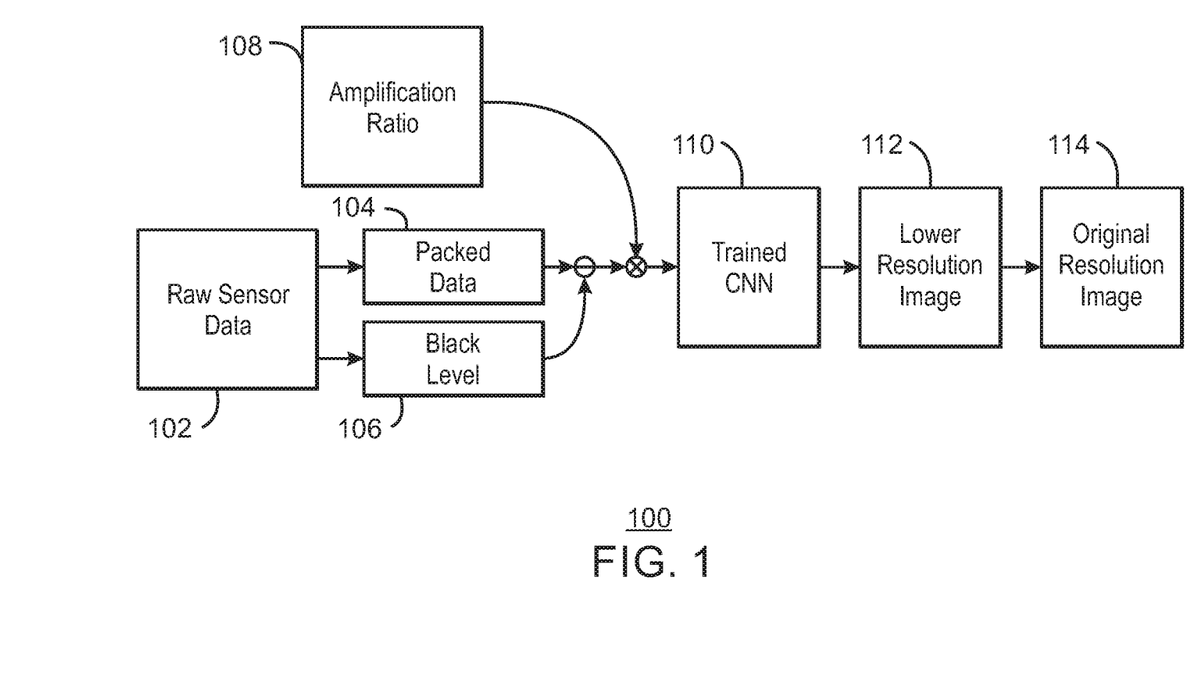
FIG. 1 is a schematic diagram illustrating an example system for imaging in low-light environments using a trained convolutional neural network.

FIG. 1 is a schematic diagram illustrating an example system for imaging in low-light environments using a trained convolutional neural network. The example system is referred to generally by the reference number 100 and can be implemented in the computing device 500 below in FIG. 5 and trained using the method 300 of FIG. 3 below.

The example system 100 includes raw sensor data 102. For example, the raw sensor data 102 may be received from one or more sensors of an imaging device such as a camera. For example, the raw sensor data 102 may be in a RAW image format. The system 100 includes packed data 104. For example, the packed data 104 may be generated based on the raw sensor data 102 by separating and packing each of the pixel color in a color filter array pattern into separate channels. For example, since the Bayer pattern includes one blue, one red, and two green pixels in a 2×2 pattern, the resulting packed data 104 would include four channel including a blue channel containing all the blue pixels, a red channel containing all the red pixels, a green channel containing green pixels in one position of the 2×2 pattern and another green channel containing the green pixels in the other position of the 2×2 Bayer pattern. The system 100 also includes a black level 106. For example, the black level may be detected in the raw sensor data 102 and removed from the packed data 104. The system 100 also includes an amplification ratio 108. For example, the amplification ratio 108 may be received from a user. In some examples, the amplification ratio 108 may be adjustable. In some examples, the amplification ratio can be automatically determined based on the input raw sensor data. For example, the amplification ratio may be set based on the mean pixel value or histogram of the input or output of the system. The system 100 also includes a trained convolutional neural network (CNN) 110. For example, the trained CNN 110 may have been trained using images captured by a sensor similar to or of the type of sensor that captured the raw sensor data 102. The system 100 includes a lower resolution image 112 generated by the trained CNN 110. For example, the lower resolution image 112 may be half the resolution of the image received in the raw sensor data 102. The system 100 further includes an original resolution image 114. For example, the original resolution image 114 can be generated from the lower resolution image and may match the resolution of image received in the raw sensor data 102.

The raw sensor data 102 may be received from an imaging sensor. For example, the imaging sensor may be a complementary metal-oxide-semiconductor (CMOS) sensor including a Bayer filter array or an X-Trans filter array, among other color filter arrays. If the imaging sensor used to capture the raw sensor data is CMOS sensor including a Bayer filter array, then the raw sensor data 102 may include a Bayer pattern image of pixels, half of which are green pixels. Likewise, if the imaging sensor used to capture the raw sensor data is a CMOS sensor using an X-Trans filter array, then the resulting raw sensor data 102 may include a pattern of 6×6 blocks. The received raw sensor data 102 can be packed into packed data 104.

The packed data 104 can include the color values of the raw sensor data 102 packed into different channels with correspondingly lower spatial resolutions. For example, if the raw sensor data 102 is a Bayer pattern, then the resulting channels may include two green channels and a red and blue channel having half the spatial resolution of the raw sensor data 102. In the case of an X-Trans filter array, the raw sensor data 102 including patterns of 6×6 blocks can be packed into nine channels by exchanging adjacent red and blue pixels. Alternatively, the raw sensor data 102 of an X-Trans filter array can be packed into 36 channels. In some examples, the packed data 104 can be generated using a duplication and masking technique. For example, the raw sensor data 102 can be duplicated for each of the red, green, and blue channels, and masked accordingly to generate three channels having the original spatial resolution of the raw sensor data 102.

A black level 106 can be determined from the raw sensor data 102 and subtracted from the packed data 104. For example, the black level 106 may correspond to an amount of an electrical signal generated by pixels in a CMOS sensor that does not reflect any incident light on the sensor. Thus, the black level 106 may be subtracted from the packed data 104 to remove this particular form of bias before the packed data 104 is amplified.

As briefly mentioned above, the amplification ratio 108 can be set externally and be received from a user and is thus adjustable. The amplification ratio 108 can be used to adjust the brightness of the output. A user can thus adjust the brightness of an output image 114 by setting different amplification factors. For example, a higher amplification factor can be set to generate brighter output images for the same input. The amplification ratio 108 can be used to scale the packed data 104 by the provided amplification ratio 108. For example, the amplification ratio may be ×100 or ×300. The amplified packed data 104 may then be input into a trained CNN 110.

The trained CNN 110 may be a fully convolutional network (FCN). The trained CNN 110 can be any suitable architecture that can process full-resolution images in GPU memory. In particular, the trained CNN 110 can be a multi-scale context aggregation network (CAN) or based on a U-Net architecture. The CAN is a convolutional network module that is specifically designed for fast image processing. The CAN uses dilated convolutions to systematically aggregate multi-scale contextual information without losing resolution. The CAN architecture is based on the fact that dilated convolutions support exponential expansion of the receptive field without loss of resolution or coverage.

U-Net is a fully convolutional network modified and extended to work with fewer training images and to yield more precise segmentations. The U-Net architecture includes a contracting path and an expansive path, which together give the network a u-shaped architecture. The contracting path is a convolutional network that includes a repeated application of convolutions, each followed by a rectified linear unit (ReLU) and a max pooling operation. In some examples, the convolutions and max pooling can be replaced with stride convolutions for the purpose of reducing spatial resolution. During the contraction, the spatial information is reduced while feature information is increased. The expansive pathway combines the feature and spatial information through a sequence of up-convolutions and concatenations with high-resolution features from the contracting path.

The trained CNN 110 may alternatively be a MobileNet. MobileNets are based on a streamlined architecture that uses depth-wise separable convolutions to build light weight deep neural networks. In some examples, a MobileNet may include global hyper-parameters that efficiently trade off between latency and accuracy. These hyper-parameters allow a model builder to choose the right sized model for their application based on the constraints of the problem, thus resulting in a more efficient trained CNN 110 that can be used in processing video, among other real-time imaging applications.

Figure 3:
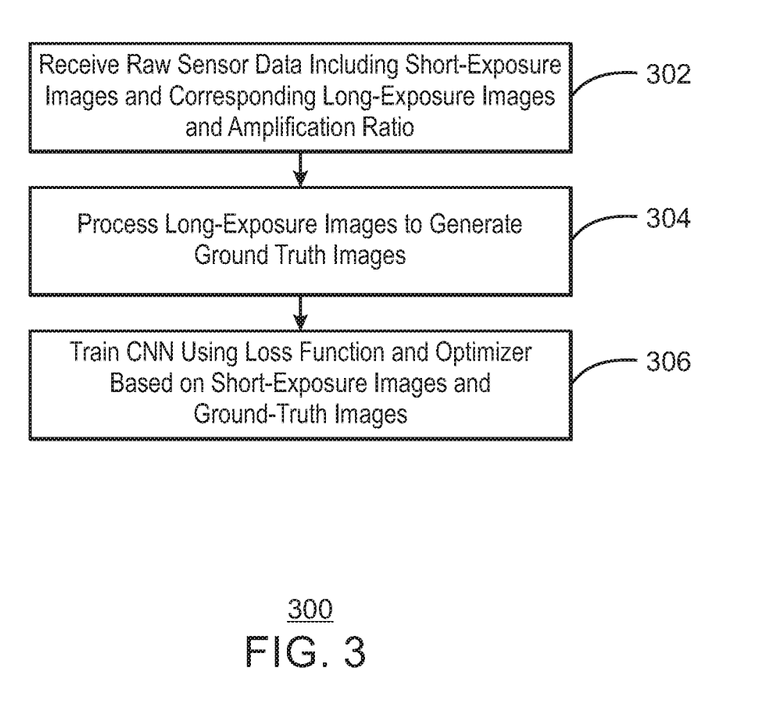
FIG. 3 is a flow chart illustrating an example method for training a convolutional neural network to process images captured in low-light conditions.

In some examples, full-resolution images may have a resolution of 4240×2832, 6000×4000, or larger. The trained CNN 110 may have been trained based on pairs of images captured by a sensor similar to the sensor that captured the raw sensor data 102. For example, the sensor may be a Bayer filter array sensor or a, X-Trans filter array and may have a similar raw data bit size. As one example, the imaging sensor may have 12 bit or 14-bit raw data. The training set of captured images used to train the CNN 110 may include pairs of fast-exposure and long-exposure images of identical scenes. For example, the CNN 110 may be trained using the method 300 described below.

The output of the trained CNN 110 can be a lower resolution image 112. For example, the output image 112 may be a 12-channel image with half the spatial resolution of the image corresponding to the raw sensor data 102. As described in greater detail below, the lower resolution image 112 can be processed using a sub-pixel layer to recover the original resolution of the raw sensor data 102. For example, channels corresponding to a particular color can be combined to form a single channel for each color having the original resolution of the raw sensor data 102.

The original resolution image 114 may thus be an illuminated image having the same resolution of the raw sensor data 102 image but with increased brightness. For example, the original resolution image 114 may appear to be as bright as an image captured with many more stops of light, but without the blur or noise associated with adjustment of various camera settings to increase the amount of captured light.

The diagram of FIG. 1 is not intended to indicate that the example system 100 is to include all of the components shown in FIG. 1. Rather, the example system 100 can be implemented using fewer or additional components not illustrated in FIG. 1 (e.g., additional data, CNNs, images, etc.). For example, the output of the CNN 110 may be the original resolution image 114 rather than the lower resolution image 112 by adding additional upsampling or up-convolution layers.

Figure 2:
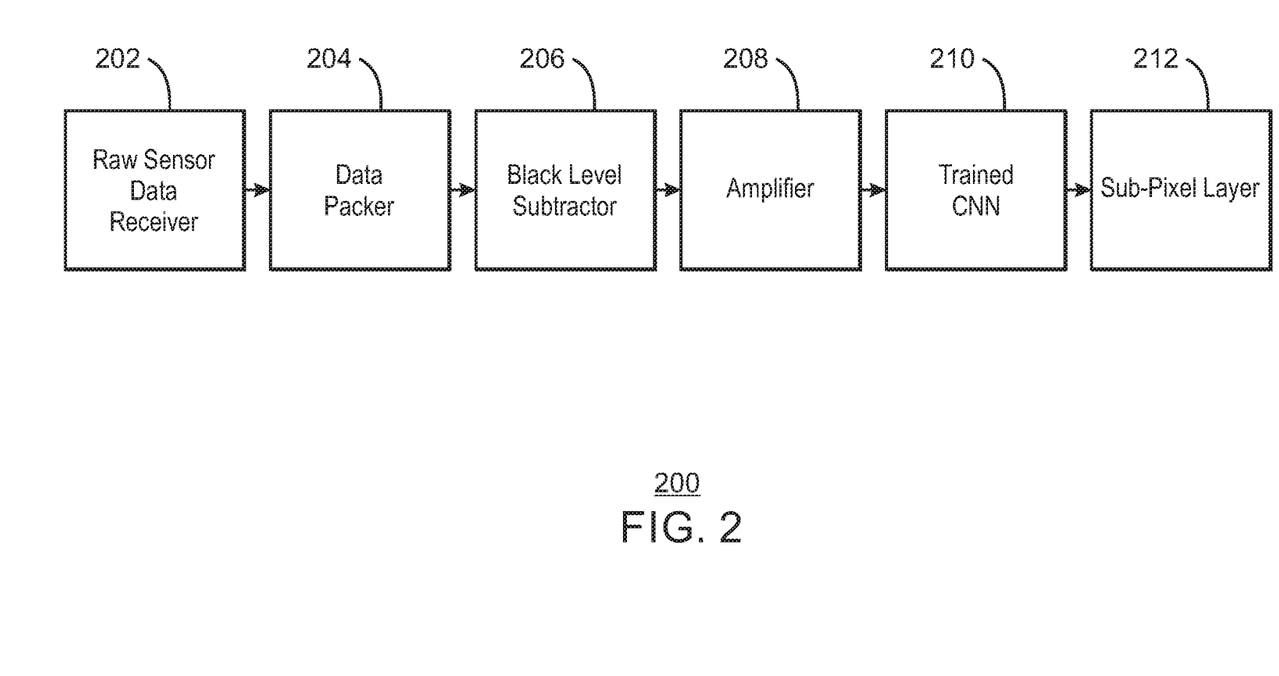
FIG. 2 is a block diagram illustrating an example pipelined processor for imaging in low-light environments using a trained convolutional neural network.

FIG. 2 is a block diagram illustrating an example pipelined processor for imaging in low-light environments using a trained convolutional neural network. The example pipelined processor is referred to generally by the reference number 200, is described with respect to the system 100 of FIG. 1 above, and can be trained using the method 300 of FIG. 3 below and implemented in the computing device 500 below in FIG. 5 using the method 400 of FIG. 4 below.

The example pipelined processor 200 includes a raw sensor data receiver 202. The pipelined processor 200 also include a data packer 204 communicatively coupled to the raw sensor data receiver 202. The pipelined processor 200 also includes a black level subtractor 206 communicatively coupled to the data packer 204. The pipelined processor 200 also further includes an amplifier 208 communicatively coupled to the black level subtractor 206. The pipelined processor 200 also includes a trained CNN 210 communicatively coupled to the amplifier 208. The pipelined processor 200 also further includes a sub-pixel layer 212 communicatively coupled to the trained CNN 210.

As shown in FIG. 2, the raw sensor data receiver 202 may receive raw sensor data from an imaging device (not shown). For example, the imaging device may be a camera. The raw sensor data may be a pattern of color pixel values as described in detail above. The data packer 204 can pack the raw sensor data received from the raw sensor data receiver 202. For example, the data packer 204 can pack the raw sensor data into packed data as described above. The black level subtractor 206 can subtract a predetermined black level from the packed data received from the data packer 204. The amplifier 208 can amplify the black-subtracted data to increase the brightness of the resulting image. The amplified data can then be send to the trained CNN 210. For example, trained CNN 210 may be the trained CNN 110 of FIG. 1 above. The trained CNN 210 can generate lower resolution image to be sent to the sub-pixel layer 212. The sub-pixel layer can process the lower resolution image to generate an original resolution image, as described above in FIG. 1. In some examples, the trained CNN 210 can generate an original resolution image directly. For example, the trained CNN 210 may contain additional upsampling or decovolution layers. The resulting illuminated image may be of the same resolution as the raw sensor data received from the imaging device, and may demonstrate a brightness of an image taken with many more stops of light.

The diagram of FIG. 2 is not intended to indicate that the example pipelined processor 200 is to include all of the components shown in FIG. 2. Rather, the example pipelined processor 200 can be implemented using fewer or additional components not illustrated in FIG. 2 (e.g., additional layers, convolutional neural networks, preprocessors, postprocessors, etc.).

FIG. 3 is a flow chart illustrating a method for training a convolutional neural network to process images captured in low-light conditions. The example method is generally referred to by the reference number 300 and can be implemented in the system 100 of FIG. 1 above, the CNN trainer 542 or processor 502 of the computing device 500 of FIG. 5 below, or the processor 602 and computer readable media 600 of FIG. 6 below.

At block 302, a processor receives raw sensor data including short-exposure images and corresponding long-exposure images. For example, the long exposure images may be of the same scenes as the short-exposure images and can be captured using a tripod or other form of device stabilization.

At block 304, the processor processes the long-exposure images. For example, the long-exposure images may be processed using a raw image processing library to convert the long-exposure images into the sRGB space or the Adobe RGB space.

At block 306, the processor trains a convolutional neural network (CNN) using a loss function and an optimizer based on the short-exposure images and the long-exposure images. For example, the processor can train the CNN based on a training set including pairs of images captured using faster shutter and slower shutter speeds via a sensor of a similar type used to capture the raw sensor data. The loss function used by the processor to train the CNN may be an L1 loss function, an L2 loss function, or a structural similarity (SSIM) loss function. For example, the L1 loss function, also known as least absolute deviations (LAD) or least absolute errors (LAE), can be used to minimize an average of the absolute differences between a true value y and a predicted value x at pixel p. For example, the L1 loss function can be calculated using the equation:

$$L1\text{Loss} = \frac{1}{N}\sum_p |x(p) - y(p)| \qquad \text{Eq. 1}$$

The L2 Loss Function can be used to minimize an error which is the average of the all the squared differences between a true value y and a predicted value x. For example, the L2 Loss Function can be calculated using the equation:

$$L2\text{Loss} = \frac{1}{N}\sum_p \|x(p) - y(p)\|^2 \qquad \text{Eq. 2}$$

In some examples, the processor can train the CNN using the Adam optimizer, published 2015. The Adam optimizer is based on adaptive estimates of lower-order moments. In particular, the Adam optimizer can compute individual adaptive learning rates for different parameters from estimates of first and second moments of the gradients. In some examples, the CNN can alternatively, or additionally, be trained using gradient decent optimizer, proximal gradient descent optimizer, RMSProp optimizer, Momentum optimizer, Adadelta optimizer or any other revised versions of these optimizers.

In some examples, the processor can train the convolutional neural network using an amplification ratio based on an exposure difference between an input training image and a corresponding reference image of an image captured using a longer shutter speed. In some examples, the convolutional neural network can be trained for a specific camera sensor using a training set of images captured using the specific camera sensor. In some examples, for each iteration of training, the processor can randomly crop a 512×512 pixel patch for training and apply random flipping and rotation for data augmentation. The processor can set a learning rate initially to $10^{-4}$ and can be reduced to $10^{-5}$ after 2000 epochs. In some examples, the training can proceed for a predetermined number of epochs. For example, the processor may train the CNN for 4000 epochs.

The resulting trained CNN can thus be used to generate illuminated images for the specific camera sensor as well as camera sensors that are similar to the camera sensor used to capture images used for the training. For example, if a particular sensor used to capture the training set includes a Bayer filter, then the resulting trained CNN may be used with other camera sensors having Bayer filters. Similarly, if the sensor used to capture the training set of images included an X-Trans filter array, then the trained CNN may be used to process images captured with X-Trans filter array sensors.

This process flow diagram is not intended to indicate that the blocks of the example process 300 are to be executed in any particular order, or that all of the blocks are to be included in every case. Further, any number of additional blocks not shown may be included within the example process 300, depending on the details of the specific implementation. In some examples, the size of the CNN and thus the input images can be reduced to increase speed at runtime. For example, the CNN can be modified to produce images in a video rate of 30 frames per second or more.

Figure 4:
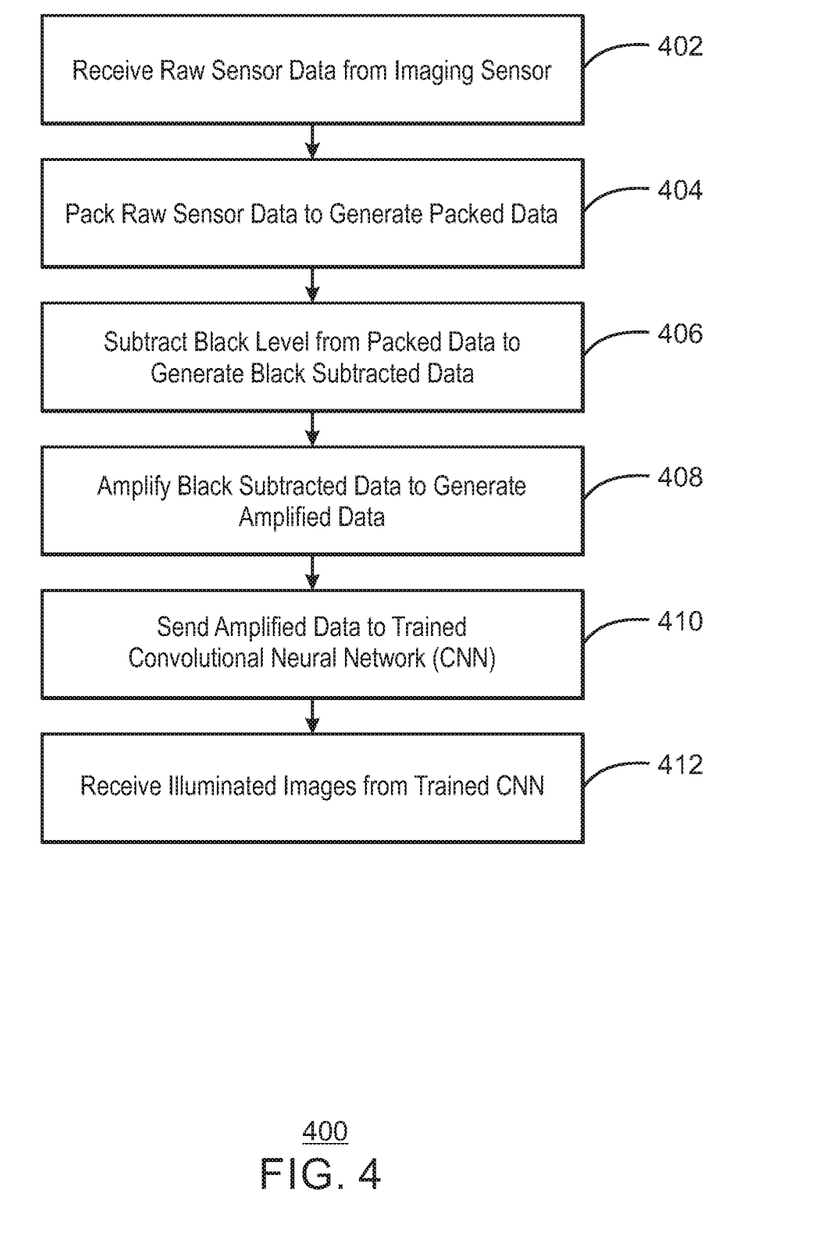
FIG. 4 is a flow chart illustrating an example method for imaging in low-light environments using a trained convolutional neural network.

FIG. 4 is a flow chart illustrating a method for imaging in low-light environments using a trained convolutional neural network. The example method is generally referred to by the reference number 400 and can be implemented in the system 100 of FIG. 1 above, the image illuminator 528 of the computing device 500 of FIG. 5 below, or the computer readable media 600 of FIG. 6 below.

At block 402, receives raw sensor data from an imaging sensor. For example, the sensor may include a color filter array that is a Bayer filter or an X-Trans filter array. The raw sensor data may thus include a Bayer filter pattern or an X-Trans filter pattern of pixels.

At block 404, the processor packs the raw sensor data to generate packed data. For example, the processor can pack the raw sensor data into four channels including a reduced spatial resolution by a factor of two in each direction to generate packed data.

At block 406, the processor subtracts a black level from packed data to generate black-level-subtracted packed data. The black level is the bias in the raw data. For example, even with a physically covered lens and no light captured at all, the raw pixel data may still not be zero. Thus, the black level is a constant bias for all pixel values and may be fixed and predetermined for the each sensor.

At block 408, the processor amplifies the black-level-subtracted packed data to generate amplified data. For example, the processor can amplify the black-level-subtracted packed data based on a received amplification ratio to generate amplified data.

At block 410, the processor sends the amplified data to a trained convolutional neural network. For example, the convolutional neural network can be trained using the method 300 of FIG. 3 above. In some examples, the convolutional neural network can be a fully convolutional network. For example, the convolutional neural network can be a multi-scale context aggregation network or be based on a U-net architecture.

This process flow diagram is not intended to indicate that the blocks of the example process 400 are to be executed in any particular order, or that all of the blocks are to be included in every case. Further, any number of additional blocks not shown may be included within the example process 400, depending on the details of the specific implementation. For example, the method may further include additional post-processing, such as processing the illuminated image using histogram stretching or using high dynamic resolution (HDR) tone mapping. For example, histogram stretching may include mapping minimum intensity in an image to a minimum value in a range of values in the image, and mapping maximum intensity in the image to the maximum value in the range of values in the image. Using high dynamic resolution (HDR) tone mapping, the processor can map one set of colors to another to approximate the appearance of high-dynamic-range images in a medium that has a more limited dynamic range.

Figure 5:
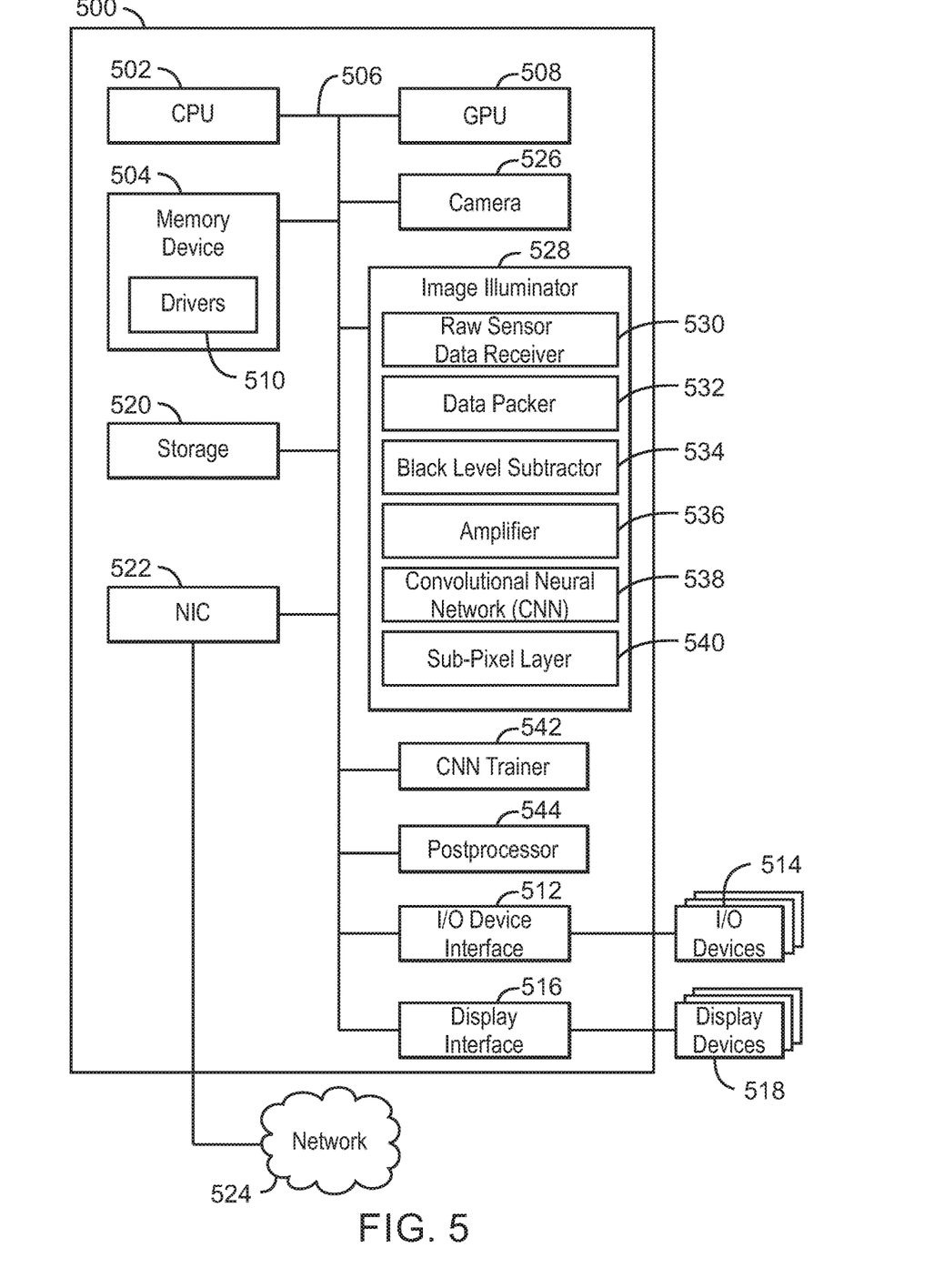
FIG. 5 is block diagram illustrating an example computing device that can capture and process images in low-light environments using a trained convolutional neural network.

Referring now to FIG. 5, a block diagram is shown illustrating an example computing device that can capture and process images in low-light environments using a trained convolutional neural network. The computing device 500 may be, for example, a laptop computer, desktop computer, tablet computer, mobile device, or wearable device, among others. In some examples, the computing device 500 may be a security camera system, a film camera, or a mobile device. The computing device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. In some examples, the CPU 502 may be a system-on-chip (SoC) with a multi-core processor architecture. In some examples, the CPU 502 can be a specialized digital signal processor (DSP) used for image processing. The memory device 504 can include random access memory (RAM), read only memory (ROM), flash memory, or any other suitable memory systems. For example, the memory device 504 may include dynamic random access memory (DRAM).

The memory device 504 can include random access memory (RAM), read only memory (ROM), flash memory, or any other suitable memory systems. For example, the memory device 504 may include dynamic random access memory (DRAM).

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for generating illuminated images in low-light conditions. The device drivers 510 may be software, an application program, application code, or the like.

The CPU 502 may also be connected through the bus 506 to an input/output (I/O) device interface 512 configured to connect the computing device 500 to one or more I/O devices 514. The I/O devices 514 may include, for example, a keyboard and a pointing device, wherein the pointing device may include a touchpad or a touchscreen, among others. The I/O devices 514 may be built-in components of the computing device 500, or may be devices that are externally connected to the computing device 500. In some examples, the memory 504 may be communicatively coupled to I/O devices 514 through direct memory access (DMA).

The CPU 502 may also be linked through the bus 506 to a display interface 516 configured to connect the computing device 500 to a display device 518. The display device 518 may include a display screen that is a built-in component of the computing device 500. The display device 518 may also include a computer monitor, television, or projector, among others, that is internal to or externally connected to the computing device 500.

The computing device 500 also includes a storage device 520. The storage device 520 is a physical memory such as a hard drive, an optical drive, a thumbdrive, an array of drives, a solid-state drive, or any combinations thereof. The storage device 520 may also include remote storage drives.

The computing device 500 may also include a network interface controller (NIC) 522. The NIC 522 may be configured to connect the computing device 500 through the bus 506 to a network 524. The network 524 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 500 further includes a camera 526. For example, the depth camera may include one or more image sensors. In some example, the camera may include a processor to generate raw sensor data.

The computing device 500 further includes an image illuminator 528. For example, the image illuminator 528 can be used to generate illuminated images from raw sensor data. The image illuminator 528 can include a raw sensor data receiver 530, a data packer 532, a black level subtractor 534, an amplifier 536, a convolutional neural network (CNN) 538, and a sub-pixel layer 540. In some examples, each of the components 530-540 of the image illuminator 528 may be a microcontroller, embedded processor, or software module. The raw sensor data receiver 530 can receive raw sensor data from an imaging sensor. In some examples, the raw sensor data may be a Bayer array. In some examples, the raw sensor data may be an X-Trans filter array, or any other form of color filter array. The data packer 532 can pack the raw sensor data to generate packed data. For example, the data packer 532 can pack the raw sensor data into four channels including a reduced spatial resolution by a factor of two in each direction to generate packed data. In some examples, the data packer 532 can arrange the raw sensor data into 6×6 blocks and pack the raw sensor data into nine channels by exchanging adjacent elements of the blocks to generate packed data. For example, the data packer 532 may arrange raw sensor data including X-Trans filter array in this way. The black level subtractor 534 can subtract a black level from packed data to generate black-level-subtracted packed data. For example, the black level subtractor 534 can subtract the black level from the raw sensor data. The amplifier 536 can amplify the black-level-subtracted packed data based on a received amplification ratio to generate amplified data. The CNN 538 can generate an illuminated image based on the received raw sensor data. In some examples, the CNN 538 can generate an illuminated image based on the amplified data generated by the amplifier 536. In some examples, the CNN 538 may be a fully convolutional network (FCN). In some examples, the CNN 538 may be a multi-scale context aggregation network or a U-net architecture. The illuminated image may be a low resolution image having a spatial resolution less than the raw sensor data or an original resolution image having a resolution of the raw sensor data. For example, the illuminated image may be a 12-channel image having a spatial resolution including half the spatial resolution of the raw sensor data. The sub-pixel layer 540 can process the illuminated image to generate an illuminated image having a resolution equal to the resolution of the raw sensor data. For example, the sub-pixel layer 540 can double the resolution the illuminated image.

The computing device 500 also includes a CNN trainer 542. The CNN trainer 542 can train the CNN 538 to generate illuminated images. In some examples, the CNN trainer 542 can train the CNN 538 based on a training set including pairs of images captured using fast-exposure and long-exposure shutter speeds. In some examples, CNN trainer 542 can train the CNN 538 based on an L1 loss, an L2 loss, or a structural similarity (SSIM) loss. In some examples, the CNN trainer 542 can train the CNN 538 using an Adam optimizer. In some examples, the CNN trainer 542 can train the CNN 538 using an amplification ratio based on an exposure difference between an input training image and a corresponding reference image including an image captured using a longer shutter speed. In some examples, the CNN trainer 542 can train the CNN 538 for a specific camera sensor using a training set of images captured using the specific camera sensor. For example, the CNN trainer 542 can train the CNN 538 using the method 300 described in FIG. 3 above.

The computing device 500 further includes a postprocessor 544. The postprocessor can process the illuminated image using histogram stretching. In some examples, the postprocessor 544 can processing the illuminated image using high dynamic resolution (HDR) tone mapping.

The block diagram of FIG. 5 is not intended to indicate that the computing device 500 is to include all of the components shown in FIG. 5. Rather, the computing device 500 can include fewer or additional components not illustrated in FIG. 5, such as additional buffers, additional processors, and the like. The computing device 500 may include any number of additional components not shown in FIG. 5, depending on the details of the specific implementation. Furthermore, any of the functionalities of the raw sensor data receiver, 530, the data packer 532, the black level subtractor 534, the amplifier 536, the CNN 538, the sub-pixel layer 540, the CNN trainer 542, and the postprocessor 544, may be partially, or entirely, implemented in hardware and/or in the processor 502. For example, the functionality may be implemented with an application specific integrated circuit, in logic implemented in the processor 502, or in any other device. In addition, any of the functionalities of the CPU 502 may be partially, or entirely, implemented in hardware and/or in a processor. For example, the functionality of the image illuminator 528 may be implemented with an application specific integrated circuit, in logic implemented in a processor, in logic implemented in a specialized graphics processing unit such as the GPU 508, or in any other device.

Figure 6:
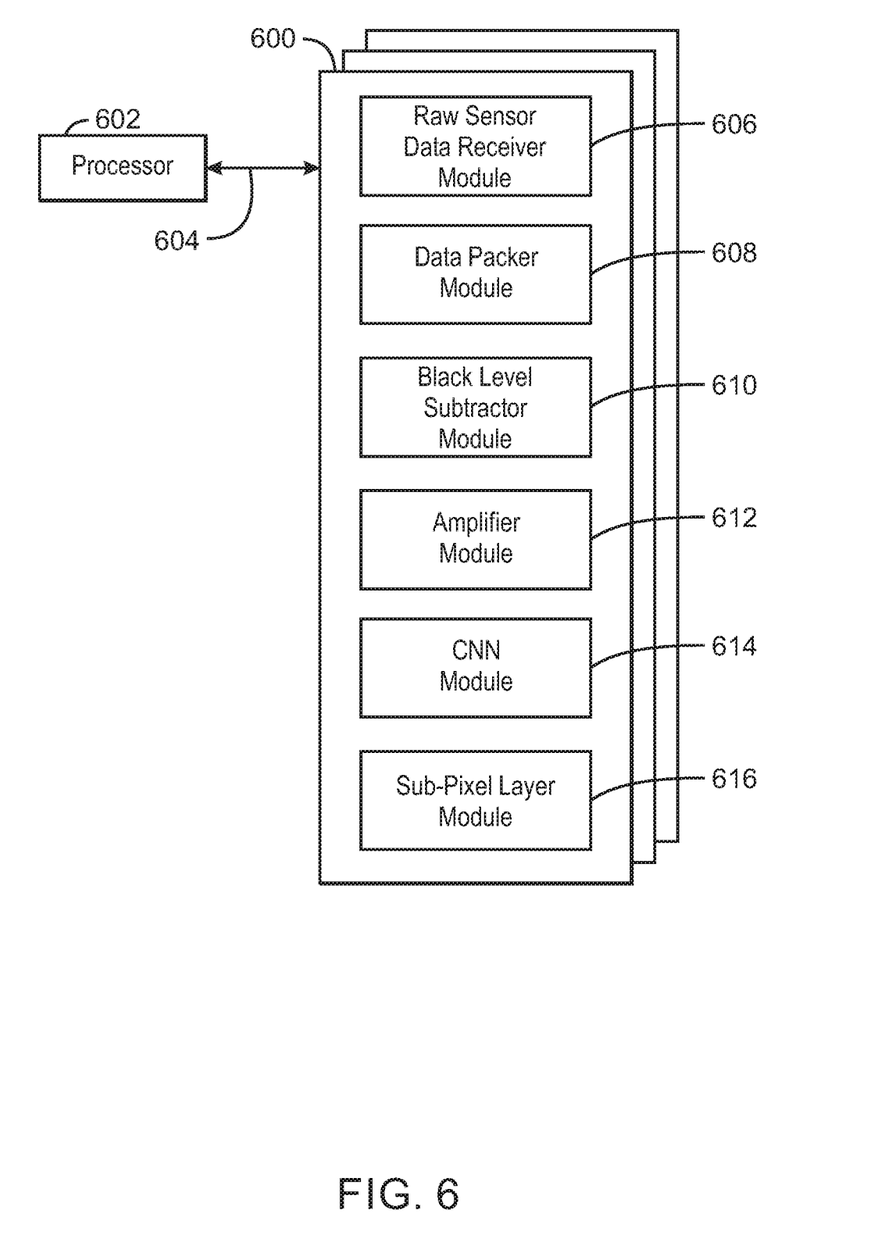
FIG. 6 is a block diagram showing computer readable media that store code for processing images in low-light environments using a trained convolutional neural network.

FIG. 6 is a block diagram showing computer readable media 600 that store code for processing images in low-light environments using a trained convolutional neural network. The computer readable media 600 may be accessed by a processor 602 over a computer bus 604. Furthermore, the computer readable medium 600 may include code configured to direct the processor 602 to perform the methods described herein. In some embodiments, the computer readable media 600 may be non-transitory computer readable media. In some examples, the computer readable media 600 may be storage media.

The various software components discussed herein may be stored on one or more computer readable media 600, as indicated in FIG. 6. For example, a raw sensor data receiver module 606 may be configured to receive raw sensor data from an imaging sensor. In some examples, the raw sensor data may include a Bayer array. In some examples, the raw sensor data may include an X-Trans array. A data packer module 608 may be configured to pack the raw sensor data to generate packed data. In some examples, the data packer module 608 may be configured to pack the raw sensor data into four channels including a reduced spatial resolution by a factor of two in each direction to generate packed data. In some examples, the data packer module 608 may be configured to arrange the raw sensor data into 6×6 blocks and pack the raw sensor data into nine channels by exchanging adjacent elements of the blocks to generate packed data. A black level subtractor module 610 may be configured to subtract a black level from packed data to generate black-level-subtracted packed data. For example, the black level subtractor 610 may be configured to generate the black level from the raw sensor data. An amplifier module 612 may be configured to amplify the black-level-subtracted packed data based on a received amplification ratio to generate amplified data. For example, the amplifier module 612 may be configured to input the amplified data into a convolutional neural network. A CNN module 614 may be configured to generate illuminated images. For example, the CNN module 614 may be configured to generate an illuminated image based on the received raw sensor data. In some examples, the CNN module 614 may be configured to generate an illuminated image based on the amplified data. A sub-pixel layer module 616 may be configured to process the illuminated image to generate an illuminated image including a resolution equal to the resolution of the raw sensor data. For example, the sub-pixel layer module 616 may be configured to double the spatial resolution of the illuminated image in each direction.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation. For example, the computer readable media 600 may also include a postprocessor module configured to process the illuminated image using histogram stretching. In some examples, the postprocessor may also be configured to process the illuminated image using HDR tone mapping.

EXAMPLES

Example 1 is an apparatus for imaging in low-light environments. The apparatus includes a raw sensor data receiver to receive raw sensor data from an imaging sensor. The apparatus also includes a convolutional neural network trained to generate an illuminated image based on the received raw sensor data. The convolutional neural network is trained based on images captured by a sensor similar to the imaging sensor.

Example 2 includes the apparatus of example 1, including or excluding optional features. In this example, the convolutional neural network is trained based on a training set including pairs of images captured using fast-exposure and long-exposure shutter speeds.

Example 3 includes the apparatus of any one of examples 1 to 2, including or excluding optional features. In this example, the convolutional neural network is trained based on an L1 loss, an L2 loss, or a structural similarity (SSIM) loss.

Example 4 includes the apparatus of any one of examples 1 to 3, including or excluding optional features. In this example, the convolutional neural network is trained using an Adam optimizer, a gradient decent optimizer, a proximal gradient descent optimizer, an RMSProp optimizer, a Momentum optimizer, an Adadelta optimizer, or any other similar optimizers.

Example 5 includes the apparatus of any one of examples 1 to 4, including or excluding optional features. In this example, the convolutional neural network is trained using an amplification ratio based on an exposure difference between an input training image and a corresponding reference image including an image captured using a longer shutter speed.

Example 6 includes the apparatus of any one of examples 1 to 5, including or excluding optional features. In this example, the illuminated image include including half the spatial resolution of the raw sensor data. The apparatus includes a sub-pixel layer to process the illuminated image to generate an illuminated image including a resolution equal to the resolution of the raw sensor data.

Example 7 includes the apparatus of any one of examples 1 to 6, including or excluding optional features. In this example, the convolutional neural network is trained for a specific camera sensor using a training set of images captured using the specific camera sensor.

Example 8 includes the apparatus of any one of examples 1 to 7, including or excluding optional features. In this example, the convolutional neural network includes a fully convolutional network (FCN).

Example 9 includes the apparatus of any one of examples 1 to 8, including or excluding optional features. In this example, the convolutional neural network includes a multi-scale context aggregation network.

Example 10 includes the apparatus of any one of examples 1 to 9, including or excluding optional features. In this example, the convolutional neural network includes a U-net architecture.

Example 11 is a method for low-light imaging. The method includes receiving, via a pipelined processor, raw sensor data from an imaging sensor. The method also includes generating, via a trained convolutional neural network of the pipelined processor, an illuminated image based on the received raw sensor data. The convolutional neural network is trained based on images captured by a sensor similar to the imaging sensor.

Example 12 includes the method of example 11, including or excluding optional features. In this example, the method includes packing the raw sensor data into four channels including a reduced spatial resolution by a factor of two in each direction to generate packed data and inputting the packed data into the trained convolutional neural network. The raw sensor data includes a Bayer array.

Example 13 includes the method of any one of examples 11 to 12, including or excluding optional features. In this example, the method includes arranging the raw sensor data into 6×6 blocks and pack the raw sensor data into nine channels by exchanging adjacent elements of the blocks to generate packed data and inputting the packed data into the trained convolutional neural network. The raw sensor data includes an X-Trans array.

Example 14 includes the method of any one of examples 11 to 13, including or excluding optional features. In this example, the method includes subtracting a black level from packed data to generate black-level-subtracted packed data, the black level generated from the raw sensor data.

Example 15 includes the method of any one of examples 11 to 14, including or excluding optional features. In this example, the method includes amplifying black-level-subtracted packed data based on a received amplification ratio to generate amplified data and sending the amplified data to the trained convolutional neural network.

Example 16 includes the method of any one of examples 11 to 15, including or excluding optional features. In this example, the method includes processing the illuminated image to generate an illuminated image including a resolution equal to the resolution of the raw sensor data.

Example 17 includes the method of any one of examples 11 to 16, including or excluding optional features. In this example, the method includes performing, via the trained convolutional neural network, blind noise suppression on the raw sensor data.

Example 18 includes the method of any one of examples 11 to 17, including or excluding optional features. In this example, the method includes performing, via the trained convolutional neural network, a color transformation on the raw sensor data.

Example 19 includes the method of any one of examples 11 to 18, including or excluding optional features. In this example, the method includes processing the illuminated image using histogram stretching.

Example 20 includes the method of any one of examples 11 to 19, including or excluding optional features. In this example, the method includes processing the illuminated image using high dynamic resolution (HDR) tone mapping.

Example 21 is at least one computer readable medium for imaging in low-light environments having instructions stored therein that direct the processor to receive raw sensor data from an imaging sensor. The computer-readable medium includes instructions that direct the processor to generate, via a convolutional neural network trained using a training set of images captured using a sensor of a similar type as the sensor of the imaging device, an illuminated image based on the received raw sensor data.

Example 22 includes the computer-readable medium of example 21, including or excluding optional features. In this example, the computer-readable medium includes instructions to pack the raw sensor data into four channels including a reduced spatial resolution by a factor of two in each direction to generate packed data. The raw sensor data includes a Bayer array.

Example 23 includes the computer-readable medium of any one of examples 21 to 22, including or excluding optional features. In this example, the computer-readable medium includes instructions to arrange the raw sensor data into 6×6 blocks and pack the raw sensor data into nine channels by exchanging adjacent elements of the blocks to generate packed data, wherein the raw sensor data includes an X-Trans array.

Example 24 includes the computer-readable medium of any one of examples 21 to 23, including or excluding optional features. In this example, the computer-readable medium includes instructions to generate a black level from the raw sensor data and subtract the black level from packed data to generate black-level-subtracted packed data.

Example 25 includes the computer-readable medium of any one of examples 21 to 24, including or excluding optional features. In this example, the computer-readable medium includes instructions to amplify the black-level-subtracted packed data based on a received amplification ratio to generate amplified data to be input into the convolutional neural network.

Example 26 includes the computer-readable medium of any one of examples 21 to 25, including or excluding optional features. In this example, the computer-readable medium includes instructions to process the illuminated image to generate an illuminated image including a resolution equal to the resolution of the raw sensor data.

Example 27 includes the computer-readable medium of any one of examples 21 to 26, including or excluding optional features. In this example, the computer-readable medium includes instructions to perform blind noise suppression on the raw sensor data.

Example 28 includes the computer-readable medium of any one of examples 21 to 27, including or excluding optional features. In this example, the computer-readable medium includes instructions to perform a color transformation on the raw sensor data.

Example 29 includes the computer-readable medium of any one of examples 21 to 28, including or excluding optional features. In this example, the computer-readable medium includes instructions to process the illuminated image using histogram stretching.

Example 30 includes the computer-readable medium of any one of examples 21 to 29, including or excluding optional features. In this example, the computer-readable medium includes instructions to process the illuminated image using high dynamic resolution (HDR) tone mapping.

Example 31 is a system for imaging in low-light environments. The system includes a raw sensor data receiver to receive raw sensor data from an imaging sensor. The system also includes a convolutional neural network trained to generate an illuminated image based on the received raw sensor data. The convolutional neural network is trained based on images captured by a sensor similar to the imaging sensor.

Example 32 includes the system of example 31, including or excluding optional features. In this example, the convolutional neural network is trained based on a training set including pairs of images captured using fast-exposure and long-exposure shutter speeds.

Example 33 includes the system of any one of examples 31 to 32, including or excluding optional features. In this example, the convolutional neural network is trained based on an L1 loss, an L2 loss, or a structural similarity (SSIM) loss.

Example 34 includes the system of any one of examples 31 to 33, including or excluding optional features. In this example, the convolutional neural network is trained using an Adam optimizer, a gradient decent optimizer, a proximal gradient descent optimizer, an RMSProp optimizer, a Momentum optimizer, or an Adadelta optimizer.

Example 35 includes the system of any one of examples 31 to 34, including or excluding optional features. In this example, the convolutional neural network is trained using an amplification ratio based on an exposure difference between an input training image and a corresponding reference image including an image captured using a longer shutter speed.

Example 36 includes the system of any one of examples 31 to 35, including or excluding optional features. In this example, the illuminated image includes a 12-channel image having a spatial resolution including half the spatial resolution of the raw sensor data. The apparatus includes a sub-pixel layer to process the illuminated image to generate an illuminated image including a resolution equal to the resolution of the raw sensor data.

Example 37 includes the system of any one of examples 31 to 36, including or excluding optional features. In this example, the convolutional neural network is trained for a specific camera sensor using a training set of images captured using the specific camera sensor.

Example 38 includes the system of any one of examples 31 to 37, including or excluding optional features. In this example, the convolutional neural network includes a fully convolutional network (FCN).

Example 39 includes the system of any one of examples 31 to 38, including or excluding optional features. In this example, the convolutional neural network includes a multi-scale context aggregation network.

Example 40 includes the system of any one of examples 31 to 39, including or excluding optional features. In this example, the convolutional neural network includes a U-net architecture.

Example 41 is a system for imaging in low-light environments. The system includes means for receiving raw sensor data from an imaging sensor. The system also includes means for generating an illuminated image based on the received raw sensor data The means for generating the illuminated image is trained based on images captured by a sensor similar to the imaging sensor.

Example 42 includes the system of example 41, including or excluding optional features. In this example, the means for generating the illuminated image is trained based on a training set including pairs of images captured using fast-exposure and long-exposure shutter speeds.

Example 43 includes the system of any one of examples 41 to 42, including or excluding optional features. In this example, the means for generating the illuminated image is trained based on an L1 loss, an L2 loss, or a structural similarity (SSIM) loss.

Example 44 includes the system of any one of examples 41 to 43, including or excluding optional features. In this example, the means for generating the illuminated image is trained using an Adam optimizer, a gradient decent optimizer, a proximal gradient descent optimizer, an RMSProp optimizer, a Momentum optimizer, or an Adadelta optimizer.

Example 45 includes the system of any one of examples 41 to 44, including or excluding optional features. In this example, the means for generating the illuminated image is trained using an amplification ratio based on an exposure difference between an input training image and a corresponding reference image including an image captured using a longer shutter speed.

Example 46 includes the system of any one of examples 41 to 45, including or excluding optional features. In this example, the illuminated image includes a 12-channel image having a spatial resolution including half the spatial resolution of the raw sensor data. The apparatus including a sub-pixel layer to process the illuminated image to generate an illuminated image including a resolution equal to the resolution of the raw sensor data.

Example 47 includes the system of any one of examples 41 to 46, including or excluding optional features. In this example, the means for generating the illuminated image is trained for a specific camera sensor using a training set of images captured using the specific camera sensor.

Example 48 includes the system of any one of examples 41 to 47, including or excluding optional features. In this example, the means for generating the illuminated image includes a fully convolutional network (FCN).

Example 49 includes the system of any one of examples 41 to 48, including or excluding optional features. In this example, the means for generating the illuminated image includes a multi-scale context aggregation network.

Example 50 includes the system of any one of examples 41 to 49, including or excluding optional features. In this example, the means for generating the illuminated image includes a U-net architecture.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for imaging in low-light environments, comprising:
a raw sensor data receiver to receive raw sensor data from an imaging sensor;
a black level subtractor to subtract a black level from packed data to generate black-level-subtracted packed data, the black level generated from the raw sensor data;
an amplifier to amplify the black-level-subtracted packed data based on a received amplification ratio to generate amplified black-level-subtracted packed data to be input into a convolutional neural network; and
the convolutional neural network trained to generate an illuminated image based on the amplified black-level-subtracted packed data, wherein the convolutional neural network is trained based on images captured by a sensor similar to the imaging sensor.

2. The apparatus of claim 1, wherein the convolutional neural network is trained based on a training set comprising pairs of images captured using fast-exposure and long-exposure shutter speeds.

3. The apparatus of claim 1, wherein the convolutional neural network is trained based on an L1 loss, an L2 loss, or a structural similarity (SSIM) loss.

4. The apparatus of claim 1, wherein the convolutional neural network is trained using an Adam optimizer, a gradient decent optimizer, a proximal gradient descent optimizer, an RMSProp optimizer, a Momentum optimizer, or an Adadelta optimizer.

5. The apparatus of claim 1, wherein the convolutional neural network is trained using an amplification ratio based on an exposure difference between an input training image and a corresponding reference image comprising an image captured using a longer shutter speed.

6. The apparatus of claim 1, wherein the illuminated image comprises a 12-channel image having a spatial resolution comprising half the spatial resolution of the raw sensor data, the apparatus comprising a sub-pixel layer to process the illuminated image to generate the illuminated image comprising a resolution equal to the resolution of the raw sensor data.

7. The apparatus of claim 1, wherein the convolutional neural network is trained for a specific camera sensor using a training set of images captured using the specific camera sensor.

8. The apparatus of claim 1, wherein the convolutional neural network comprises a fully convolutional network (FCN).

9. The apparatus of claim 1, wherein the convolutional neural network comprises a multi-scale context aggregation network.

10. The apparatus of claim 1, wherein the convolutional neural network comprises a U-net architecture.

11. A method for low-light imaging, comprising:
receiving, via a pipelined processor, raw sensor data from an imaging sensor;
subtracting a black level from packed data to generate black-level-subtracted packed data, the black level generated from the raw sensor data;
amplifying the black-level-subtracted packed data based on a received amplification ratio to generate amplified black-level-subtracted packed data and sending the amplified black-level-subtracted packed data to a trained convolutional neural network; and
generating, via the trained convolutional neural network of the pipelined processor, an illuminated image based on the amplified black-level-subtracted packed data, wherein the trained convolutional neural network is trained based on images captured by a sensor similar to the imaging sensor.

12. The method of claim 11, comprising packing the raw sensor data into four channels comprising a reduced spatial resolution by a factor of two in each direction to generate packed data and inputting the packed data into the trained convolutional neural network, wherein the raw sensor data comprises a Bayer array.

13. The method of claim 11, comprising arranging the raw sensor data into 6×6 blocks and pack the raw sensor data into nine channels by exchanging adjacent elements of the 6×6 blocks to generate packed data and inputting the packed data into the trained convolutional neural network, wherein the raw sensor data comprises an X-Trans array.

14. The method of claim 11, comprising processing the illuminated image to generate the illuminated image comprising a resolution equal to the resolution of the raw sensor data.

15. The method of claim 11, comprising performing, via the trained convolutional neural network, blind noise suppression on the raw sensor data.

16. The method of claim 11, comprising performing, via the trained convolutional neural network, a color transformation on the raw sensor data.

17. The method of claim 11, comprising processing the illuminated image using histogram stretching.

18. The method of claim 11, comprising processing the illuminated image using high dynamic resolution (HDR) tone mapping.

19. At least one computer readable medium for imaging in low-light environments having instructions stored therein that, in response to being executed on a computing device, cause the computing device to:
receive raw sensor data from an imaging sensor; and
generate a black level from the raw sensor data and subtract the black level from packed data to generate black-level-subtracted packed data;
amplify the black-level-subtracted packed data based on a received amplification ratio to generate amplified black-level-subtracted packed data to be input into a convolutional neural network; and
generate, via the convolutional neural network trained using a training set of images captured using a sensor of a similar type as the imaging sensor, an illuminated image based on the amplified black-level-subtracted packed data.

20. The at least one computer readable medium of claim 19, comprising instructions to pack the raw sensor data into four channels comprising a reduced spatial resolution by a factor of two in each direction to generate packed data, wherein the raw sensor data comprises a Bayer array.

21. The at least one computer readable medium of claim 19, comprising instructions to arrange the raw sensor data into 6×6 blocks and pack the raw sensor data into nine channels by exchanging adjacent elements of the 6×6 blocks to generate packed data, wherein the raw sensor data comprises an X-Trans array.

* * * * *